US006169558B1

(12) United States Patent
Melotti et al.

(10) Patent No.: US 6,169,558 B1
(45) Date of Patent: Jan. 2, 2001

(54) PROCESS AND APPARATUS FOR HIGH SPEED LASER PRINTING USING A ROLLER HAVING A CONVERTIBLE STRUCTURE

(75) Inventors: Renzo Melotti, Sala Monferrato; Sergio Molino, Moncalvo, both of (IT)

(73) Assignee: Valmet Rotomec S.p.A., San Giorgio Monferrato (IT)

( * ) Notice: Under 35 U.S.C. 154(b), the term of this patent shall be extended for 0 days.

(21) Appl. No.: 09/123,478

(22) Filed: Jul. 28, 1998

(30) Foreign Application Priority Data

Mar. 5, 1998 (IT) .................................... TO 98 A 000 177

(51) Int. Cl.[7] ............................ B41J 2/385; G01D 15/06; G03G 15/01

(52) U.S. Cl. .......................... 347/115; 347/118; 347/129; 347/134; 347/139

(58) Field of Search .................................... 347/134, 129, 347/256, 103, 115, 139, 118

(56) References Cited

U.S. PATENT DOCUMENTS 4,833,530 * 5/1989 Kohashi .......................... 347/103 X
5,523,193 * 6/1996 Nelson ............................ 347/134 X
5,982,409 * 11/1999 Hirokane et al. .................... 347/256

* cited by examiner

*Primary Examiner*—Susan S. Y. Lee
(74) *Attorney, Agent, or Firm*—Young & Thompson

(57) ABSTRACT

A laser printing process using a rotary light sensitive roller electrically charged by points by a laser beam and intended for receiving onto the charged points particles of a toner powder and then transferring the same onto a band to be printed, includes a first step wherein the image to be printed is stored, by a first laser beam coming from a first laser source controlled by a computer, onto a rotary memory roller whose surface is covered with a layer of a material capable of assuming either an amorphous or a crystalline structure, this structure being convertible under the action of a laser beam, and this material showing a high difference in reflecting ability according to whether it assumes the one or the other of its structures, and includes a second step wherein the thus stored image is transferred, by the optical reflection of a second laser beam coming from a second laser source having in its whole a linear character, onto the light sensitive roller intended to receive the toner and to transfer the image onto the band to be printed.

12 Claims, 4 Drawing Sheets

PROCESS AND APPARATUS FOR HIGH SPEED LASER PRINTING USING A ROLLER HAVING A CONVERTIBLE STRUCTURE

BACKGROUND OF THE INVENTION

1. Field of the Invention

This invention concerns to a process for high speed laser printing as well as to an apparatus intended for carrying out this process.

2. Description of the Prior Art

As known, within the laser printers a rotary light sensitive roller is employed, which is activated by points of a laser beam having a suitable wave length, that generates on the surface of the light sensitive roller a pattern of positively charged points forming the image to be printed. The light sensitive roller is partially immersed in a liquid toner containing tiny negatively charged particles of colored powder kept suspended in a liquid whose nature is such as not to wet the light sensitive roller. The particles of negatively charged toner powder adhere therefore to the positively charged points of the light sensitive roller, which then by rotating transfers the image onto a band to be printed, for example a band of paper. Then, heating means cause the toner powders deposited on the band to melt, thus fixing the printed image. For a polychromatic printing, such process is repeated by using, in subsequent stations, toners containing powders of different colors.

In the known systems, the light sensitive roller is directly charged by a laser beam coming from a dot-shaped source controlled by a computer, and this beam has to charge for each turn of the light sensitive roller, namely for each printing operation, a very large number of points which corresponds to the number of pixels by which the image is defined, a number which may amount to millions or billions. Notwithstanding the high processing power of the modern computers, the very large number of operations to be repetitively effected for each turn of the light sensitive roller limits the printing speed. A limitation to the printing speed also results from the mechanical displacements that the laser unit should effect in order to scan each generatrix of the light sensitive roller. For these reasons the laser printing process cannot be suitably adopted for of massive productions, as for example those of the food packing or the magazine printing industries. Another unfavorable consequence of the limitations to the printing speed is that, in order to obviate therefor, one is sometimes led to limit the image definition, and therefore the number of pixels defining the image.

SUMMARY OF THE INVENTION

The object of this invention is therefore to provide a new laser printing process, and the apparatus intended to carry out the same, which should not be subjected to the said speed limitation, or may be subjected thereto in a substantially lower measure, and which, therefore, are suitable for being adopted for massive productions too, without reducing or even by increasing the image definition.

This object is attained, according to the invention, by a laser printing process using a rotary light sensitive roller electrically charged by points by a laser beam and intended for receiving onto the charged points a toner powder and then transferring the same onto a band to be printed, which comprises a first step wherein the image to be printed is stored, by a first laser beam coming from a first dot-shaped source controlled by a computer, onto a rotary memory roller whose surface is covered with a layer of a material capable of assuming either an amorphous or a crystalline structure, said structure being convertible under the action of a laser beam, said material showing a high difference in reflecting ability according to whether it assumes the one or the other of said structures, and comprises a second step wherein the thus stored image is transferred, by means of the optical reflection of second laser beams coming from a second source having in its whole a linear character, onto the light sensitive roller intended to receive the toner and to transfer the image onto the band to be printed.

Substantially, the process usually employed for charging an image by a pattern of single points, under the control of a computer, onto the light sensitive roller, is instead employed according to the invention for storing the image onto a memory roller. During this operation, the usual limitations to the operating speed are encountered. However, this operation has not to be repeated for each printing operation, but it has only to be effected once at the start of a repetitive print cycle of the same image, whereby the time spended for this operation has no importance. On the contrary, the printing speed is only influenced by the time needed for transferring the image from the memory roller onto the light sensitive roller, and this time may be radically reduced because this operation does not require any processing and it is effected by a standing unit, through the optical reflection of an entire series of points, by action of the second laser beams coming from a source which is linear in its whole. This second laser beam may cover the entire width of the light sensitive roller and therefore of the band to be printed. As a consequence it is possible to attain printing speeds which are much larger than the usual ones, and are suitable for massive productions too.

Correspondingly, the apparatus intended for carrying out the process according to the invention includes a rotary light sensitive roller, a toner distributing means co-operating with said light sensitive roller, means for advancing a band along a trajectory to co-operate with said rotary light sensitive roller in order to be printed, a rotary memory roller, a layer of a memory material covering the surface of said rotary memory roller, said memory material being capable of assuming either an amorphous or a crystalline structure, said structure being convertible under the action of a laser beam, and said memory material showing a high difference in reflecting ability according to whether it assumes the one or the other of said structures, a first laser beam emitting device including a first dot-shaped source, a computer controlling said first dot-shaped source and a first optical system arranged for forming onto said rotary memory roller an image to be printed, and a transfer device including a second source of second laser beams, which is linear in its whole, a second optical system arranged for focusing said second laser beams onto a generatrix of said rotary memory roller, from which they are reflected, and a third optical system arranged for projecting onto a generatrix of said light sensitive roller the laser beams reflected by said generatrix of said rotary memory roller onto which said second laser beams have been focused.

Said first laser beam emitting device includes a first dot-shaped source, a computer controlling said first dot-shaped source and a first optical system arranged for forming onto said rotary memory roller an image to be printed, all these components substantially conforming the corresponding components usually employed for forming an image onto the surface of a rotary light sensitive roller.

Said second source of second laser beams may be linear in the whole of its own extension, or it may be formed by a series of juxtaposed linear sources of more reduced extension or dot-shaped sources, arranged in line in order to form in their whole an extended linear source.

Said second and third optical systems may be partially combined with each other and comprise a semi-reflecting surface arranged for deviating towards said rotary light sensitive roller the laser beams reflected by said rotary memory roller.

Preferably, said memory material covering said rotary memory roller is an amorphous/crystalline material of a type suitable for being written repeatedly. Said memory material covering said rotary memory roller may be formed of $Te/TeO_x$, $In/InO_x$, $Cu/CuN_x$ or $Sb_2/Se_3$. The subscript "x" represents any numeral compatible with the indicated chemical formula.

Said rotary light-sensitive roller and said rotary memory roller may be actuated in solid manner or be synchronized in a rigid manner, but preferably they have independent actuation means. In this latter case it is possible to rotate said two rollers with different speeds, and therefore to regulate the length of the printed image, in order to accurately positioning the same onto the printed band, by only acting on the actuation means of the rollers, without modifying the stored image.

For a polychromatic printing, several devices as those described above, employing toners of different colors, are arranged in line along the trajectory of a band to be printed, by preferably inserting between each pair of said devices heating means capable of fixing, at least partially, the toner.

BRIEF DESCRIPTION OF THE DRAWINGS

These and other features, objects and advantages of the subject of this invention will appear more clearly from the following description of some embodiments, having the character of non-limiting examples, with reference to the accompanying drawings, wherein.

DESCRIPTION OF THE PREFERRED EMBODIMENTS

Figure 1:
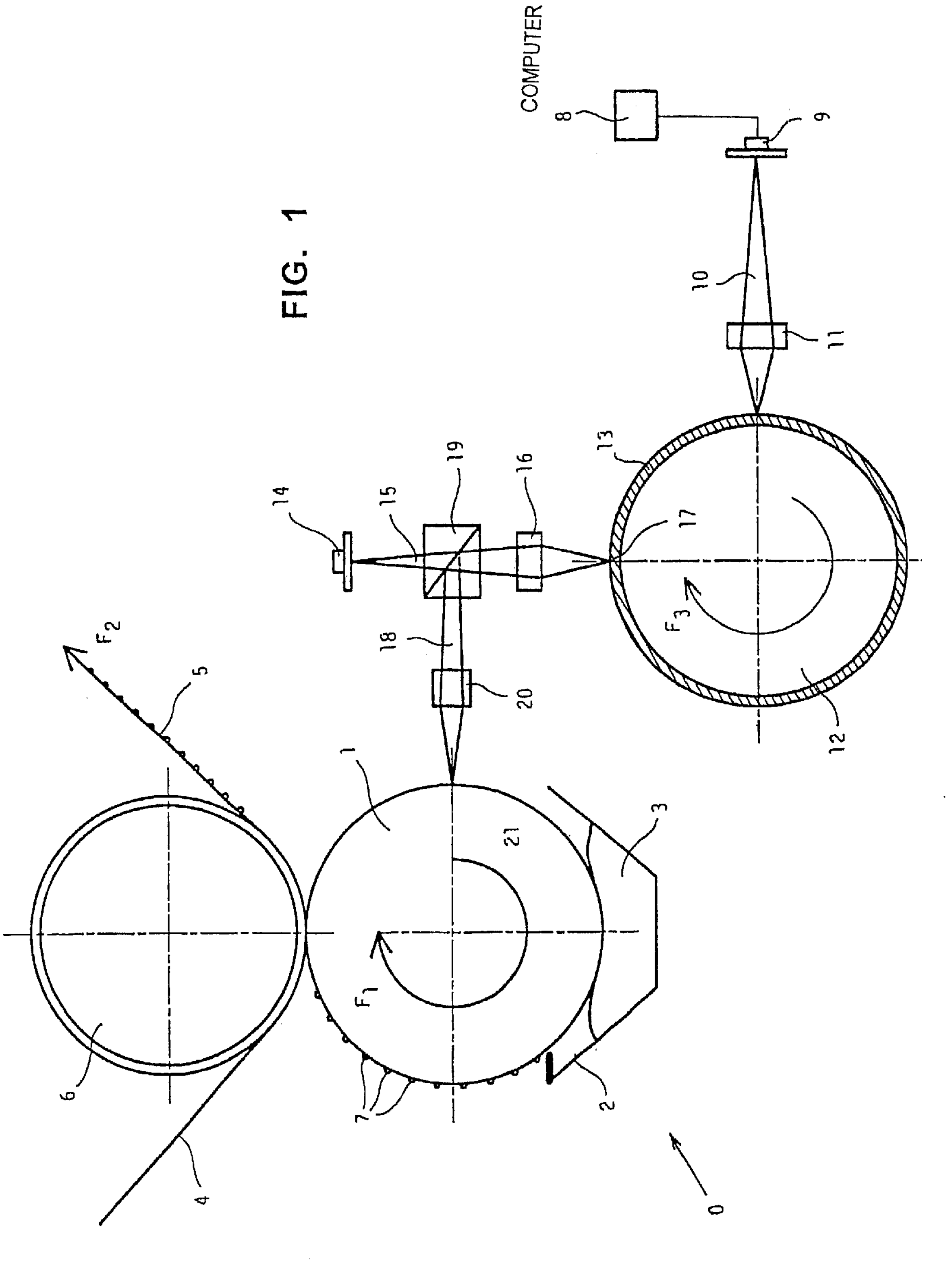
FIG. 1 diagrammatically shows the principle of the invention, with reference to a mo chromatic printing system.

The principle of the invention will be clarified having reference to FIG. 1, which represents the diagram of a monochromatic laser printing device according to the invention.

Number 1 designates a light sensitive roller which is made to rotate according to arrow $F_1$. The light sensitive roller 1 is partially immersed in a tank 2 which contains a liquid toner 3 formed by tiny, negatively charged particles of colored powder kept suspended in a liquid, the nature of this liquid being such that it does not wet the light sensitive roller 1. By action of laser beams, as explicated later on, the light sensitive roller 1 is positively charged according to a pattern of points which define the image to be printed. When the surface of the light sensitive roller 1 passes within the tank 2, the negatively charged particles of colored powder of the toner adhere to the positively charged points of the light sensitive roller. Therefore, the light sensitive roller 1 comes out of the tank 2 by taking on its surface a number of points 7 formed by colored powder, whose pattern defines the image to be printed. A band 4 to be printed is kept in contact with the light sensitive roller 1 by action of a rubberized pressing roller 6, and this band 4 proceeds along a trajectory according to arrow $F_2$, departing from the narrow passage between the rollers 1 and 6 as a printed band 5. The printed band 5 is intended to be directed to heating means (not represented in this Figure) in order to melt the colored powder forming the image and thus to fix the image. The components described up to this point show no difference with respect to the corresponding components of a usual laser printer employing liquid toner.

A dot-shaped source 9 generating a first laser beam 10 is put under control of a computer 8, and a first optical system 11 focuses this first laser beam 9 onto a generatrix of a memory roller 12. The laser beam system 8 to 11 does not differ from the system usually employed in the laser printers for forming an image onto a light sensitive roller, but in this case the image is formed, on the contrary, onto the memory roller 12.

The memory roller 12 is made to rotate according to arrow $F_3$, and its surface is covered by a layer 13 which is formed by a material capable of assuming either an amorphous or a crystalline structure, said structure being convertible under the action of a laser beam, and said material showing a high difference in reflecting ability according to whether it assumes the one or the other of said structures. Preferably, said memory material covering said rotary memory roller is an amorphous/crystalline material of a type suitable for being written repeatedly. Said memory material covering said rotary memory roller may be formed, for example, of $Te/TeO_x$, $In/InO_x$, $Cu/CuN_x$ or $Sb_2/Se_3$. As noted above, the subscript "x" represents any numeral compatible with the indicated chemical formula.

Therefore, the system 8 to 11 generates by a pattern of points, onto the layer 13 of the memory roller, an image, which is the image to be printed and is represented by points of the surface of layer 13 wherein the structure of the material has been converted by the action of the laser beams 10 and as a consequence has taken a reflecting ability different from that of the remaining surface of layer 13. The system 8 to 11 is activated when the print of a certain image is to be started, and once the image has been thus generated on the memory roller 12–13, the system 8–11 ends its operation and reverts to rest until the print of a different image is required to start. Therefore, there is no need for the system 8–11 to have a high operating speed, and the time spended for forming the image onto the memory roller has no importance because this operation has not to be repeated during printing.

The device further comprises a second source 14 generating a second laser beam 15. This second source should be realized as extending linearly along a direction perpendicular to the plane of FIG. 1, and the laser beam 15 produced by this second source 14, after having been focused as explained later on, should cover the entire width of the light sensitive roller 1, which corresponds to the width to be printed onto the band 4. The second source 14 may either be a single source per se linear on its entire length, or it may result from the juxtaposition of several linear sources of reduced length or of dot-shaped sources.

The second laser beam 15 is focused onto a generatrix 17 of the memory roller 12–13 by action of an optical system 16. Both the source 14 and the optical system 16 may be stationary, because the generatrix 17 need not be scanned. On the generatrix 17, the second laser beam 15 focused thereon is reflected by the reflecting points of the surface 13 which register with the generatrix 17, and therefore this second laser beam transfers the information concerning an entire line of points of the image to be printed. The reflected beam 18 is separated from the incident beam 15 by action of a semireflecting prism 19, and by action of an optical system 2Q (which may also be stationary too) is focused onto a generatrix 21 of the light sensitive roller 1, where it generates a line of positively charged points, forming a line of points of the image to be printed.

As it has been remarked, the entire group of components 14 to 20 for the transfer of the image from the memory roller 12 to the light sensitive roller 1 is stationary and it operates by purely optical way, so it does not involve any delay. Therefore, the printing speed that may be attained depends only on the mechanical features of the machine and on the aptitude of the band 4 for being speedily treated, and it is in no way subjected to the usual prior art limitations, which depend on the processing of the control of the dot-shaped laser beam source and on the mechanical displacements of the laser unit.

The device described until now is monochromatic. As usual, if a printing with several colors is required, several monochromatic printing devices should be used, which are disposed subsequent each other along the trajectory of the band to be printed and employ toners containing powders of different colors. In the examples shown in FIGS. 2 to 4, each printing device according to FIG. 1 is designed, in its whole, by the reference 0.

Figure 2:
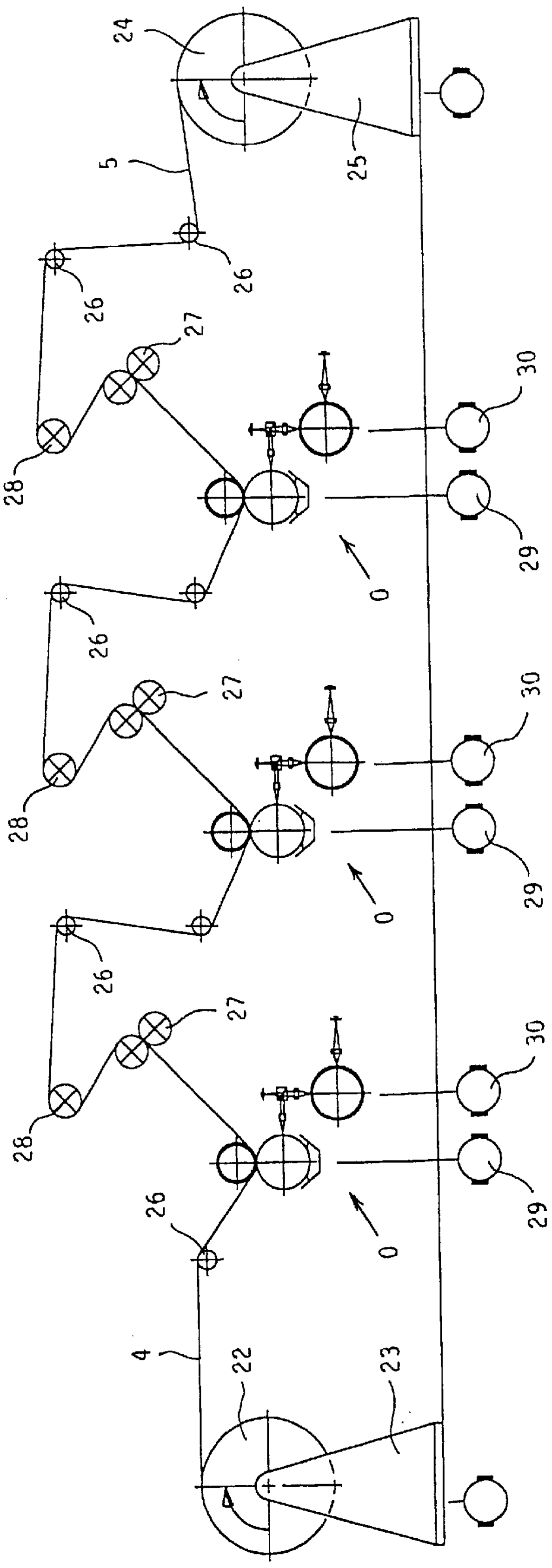
FIG. 2 shows how three printing devices, each substantially conforming FIG. 1, may be combined together, by inserting heating rollers between each pair of printing devices, in order to create a trichromatic printing system.

According to the example of FIG. 2, the band 4 to be printed comes from a roll 22 mounted in a unwinding device 22, and after the entire operation the printed band 5 is collected on a roll 24 mounted in a winding device 25. Along the trajectory of the band 4–5 there are provided three printing devices 0, and between each pair of them there are provided returning rollers 26, heated rollers 27 intended to fix the image each time formed onto the band by the foregoing printing device 0, and refrigerated rollers 20.

It is to be remarked in this Figure that the light sensitive rollers of the different printing devices 0 are moved by their own motors 29, and that the memory rollers are moved by their own motors 30. This arrangement allows operating the memory rollers with a speed different from the speed of the light sensitive rollers. This difference in speed produces a modification in the length of the image printed by each printing device 0, with respect to the image stored in the same printing device. It is therefore possible to put in register the print with several colors, without any need of modifying the stored images.

Figure 3:
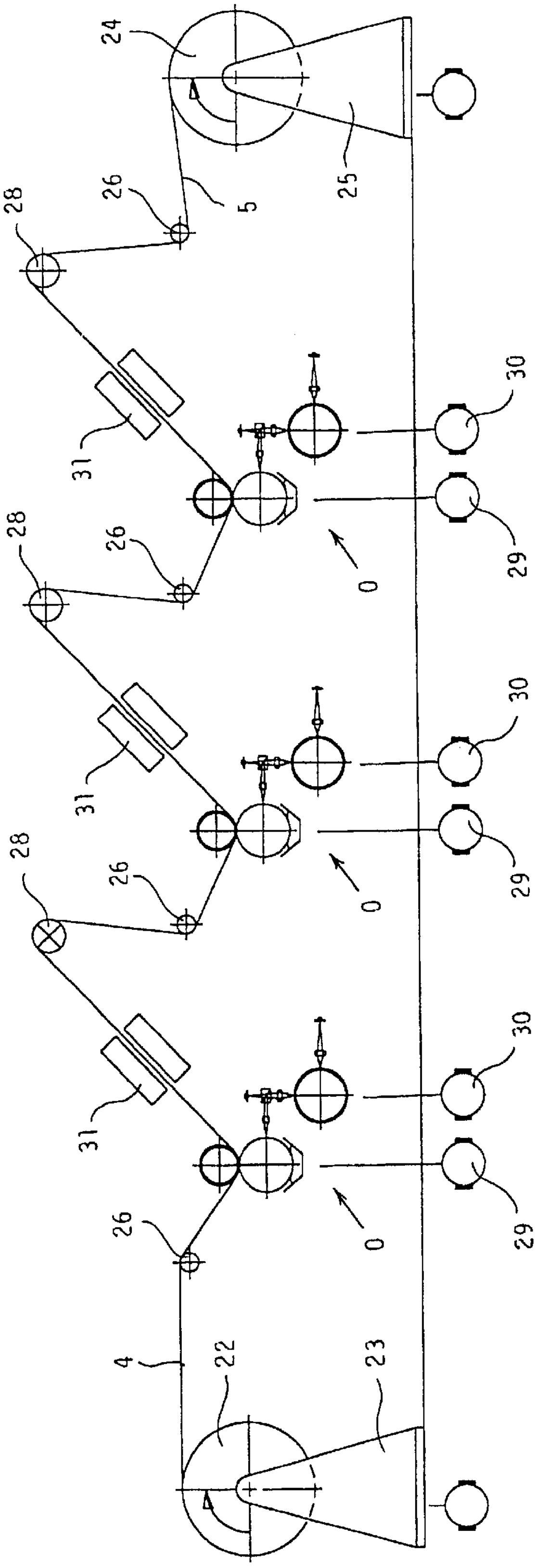
FIG. 3 shows in a similar way how three printing devices. each substantially conforming FIG. 1, may be combined together, by inserting heating ovens between each pair of printing devices, in order to create a trichromatic printing system.

FIG. 3 shows a trichromatic printing system substantially similar to that shown in FIG. 2, the only difference being that the heated rollers 27 are replaced here by heating ovens 31.

Figure 4:
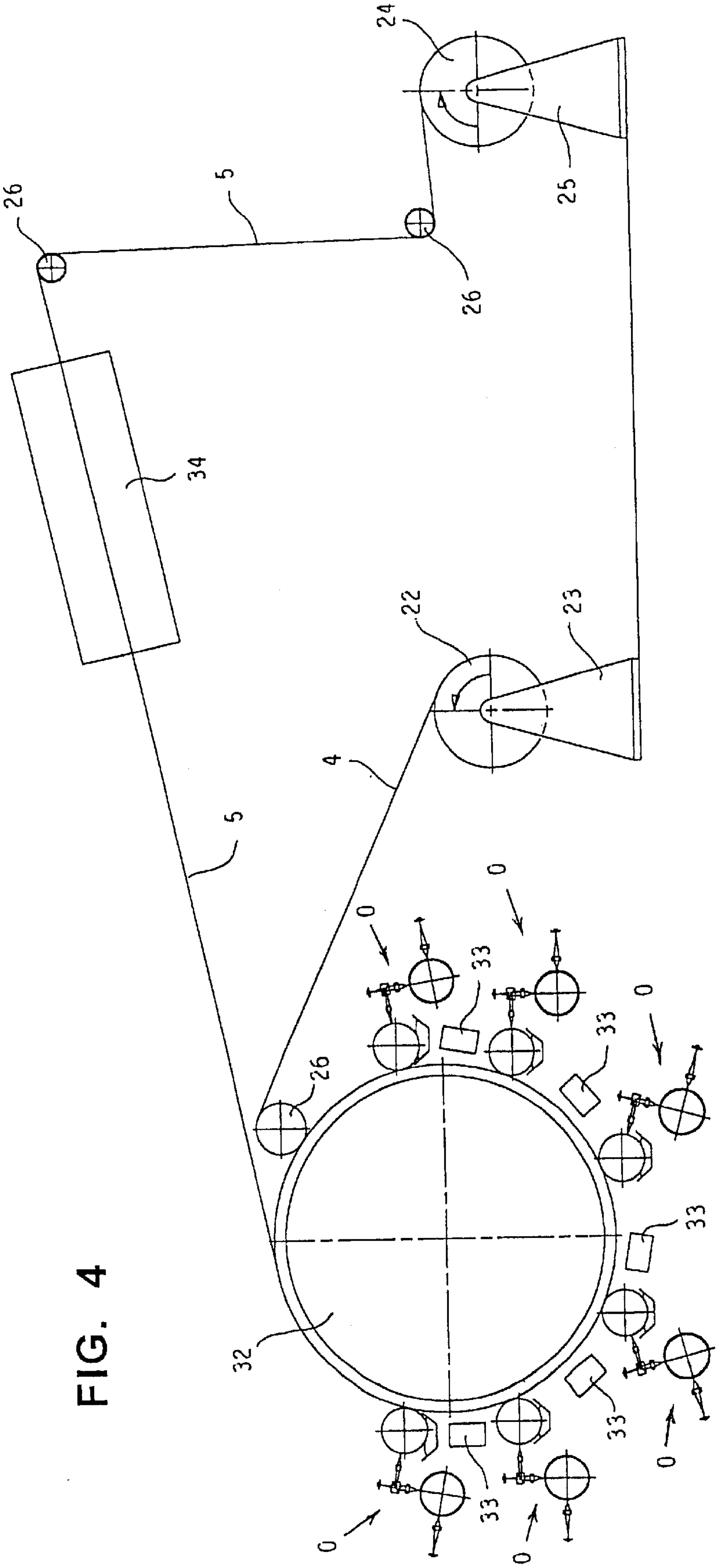
FIG. 4 shows how six printing devices, each substantially conforming FIG. 1, may be combined together around a large rubberized pressing roller, in order to create an esachromatic printing system.

Finally, FIG. 4 represents a printing system operating with six colors, wherein the band 4 to be printed, which comes from a roll 22 mounted in a unwinding device 23 and is directed to the receiving roll 24 mounted in the winding device 25, passes around a large rubberized pressing roller 32. Around the pressing roller 32 there are arranged six printing devices 0. Between each pair of printing devices 0 there are provided heating means 33 intended to produce a provisional fixing of the partial image generated by the foregoing printing device 0, before the band reaches the subsequent printing device 0. The final fixing of the complete image takes then place in a heating oven 34.

It should be understood that the invention is not limited to the embodiments described and shown as examples. Several modifications are possible for those skilled in the art. For example, the first laser system 8–11 intended to generate the stored image may be any one of the devices having this task, known in the art. The system 14–20 for transferring the image from the memory roller 12 to the light sensitive roller 1 may be embodied and/or arranged in a manner different from that described, though remaining unchanged its operation. Each of the pair of motors 29–30 may be replaced by a single motor operating at least one of the rollers through a device suitable for changing the transmission ratio in gradual manner. The number of printing stations in a polychrome printing system may be various; and the process and apparatus according to the invention may also be applied to laser printing systems making use of a non-liquid toner.

These and other changes and any replacement by technically equivalent means may be introduced in the embodiments described and shown, without departing from the spirit of the invention and the scope of this patent.

What is claimed is:

1. A laser printing process using a rotary light sensitive roller electrically charged by points of a laser beam and intended for receiving particles of a toner powder onto the charged points and then transferring the particles onto a band to be printed, which comprises:

a first step wherein the image to be printed is stored, by a first laser beam coming from a first laser source controlled by a computer, onto a rotary memory roller whose surface is covered with a layer of a convertible material assuming either an amorphous or a crystalline structure under the action of a laser beam, and said convertible material showing a high difference in reflecting ability according to whether it assumes the amorphous structure or the crystalline structure; and a second step wherein the thus stored image is transferred, by means of the optical reflection of a second laser beam coming from a second laser source having in its whole a linear character, onto the light sensitive roller intended to receive the toner and to transfer the image onto the band to be printed.

2. An apparatus for carrying out a laser printing process, comprising:

a rotary light sensitive roller;

a means for rotating said light sensitive roller;

a toner distributing means co-operating with said light sensitive roller, means for advancing a band along a trajectory to co-operate with said rotary light sensitive roller in order to be printed;

a rotary memory roller;

a means for rotating said memory roller;

a layer of a memory material covering a surface of said rotary memory roller, said memory material being convertible into either an amorphous or a crystalline structure under the action of a laser beam, and said memory material showing a high difference in reflecting ability according to whether it assumes the one or the other of said structures;

a first laser beam emitting device including a first laser source;

a computer controlling said first laser source and a first optical system arranged for forming onto said rctary memory roller an image to be printed;

a transfer device including a second laser source of a second laser beam, which is linear in its whole, a second optical system arranged for focusing said second laser beam onto a generatrix of said rotary memory roller, from which they are reflected; and a third optical system arranged for projecting onto a generatrix of said light sensitive roller the laser beams reflected by said generatrix of said rotary memory roller onto which said second laser beam has been focused.

3. An apparatus as set forth in claim 2, wherein said transfer device is stationary.

4. An apparatus as set forth in claim 2, wherein said second source of second laser beam is linear in the whole of its own extension.

5. An apparatus as set forth in claim 2, wherein said second source of second laser beam is formed by a series of juxtaposed linear sources of more reduced extension or dot-shaped sources, arranged in line in order to form an extended linear source.

6. An apparatus as set forth in claim 2, wherein said second and third optical systems are partially combined with each other and comprise a semi-reflecting surface arranged for deviating towards said rotary light sensitive roller the laser beams reflected by said rotary memory roller.

7. An apparatus as set forth in claim 2, wherein said memory material covering said rotary memory roller is an amorphous/crystalline material of a type suitable for being written repeatedly.

8. An apparatus as set forth in claim 2, wherein said memory material covering said rotary memory roller is formed of $Te/TeO_x$, $In/InO_x$, $Cu/CuN_x$ or $Sb_2/Se_3$.

9. An apparatus as set forth in claim 2, wherein said rotary light-sensitive roller and said rotary memory roller are synchronized in a rigid manner.

10. An apparatus as set forth in claim 2, wherein said rotary light-sensitive roller and said rotary memory roller have independent actuation means suitable for rotating both said rollers with different speeds.

11. An apparatus for a polychromatic printing, wherein several printing devices as see forth in claim 2, employing toners of different colors, are arranged in line along a trajectory of a band to be printed.

12. An apparatus as set forth in claim 11, wherein a heating means for fixing, at least partially, the toner, is inserted between each pair of said printing devices.

* * * * *